July 8, 1941. R. G. HANSEN 2,248,170
ADJUSTABLE CARRYING BRACKET FOR AUTOMOBILES
Filed Aug. 9, 1938 2 Sheets-Sheet 2
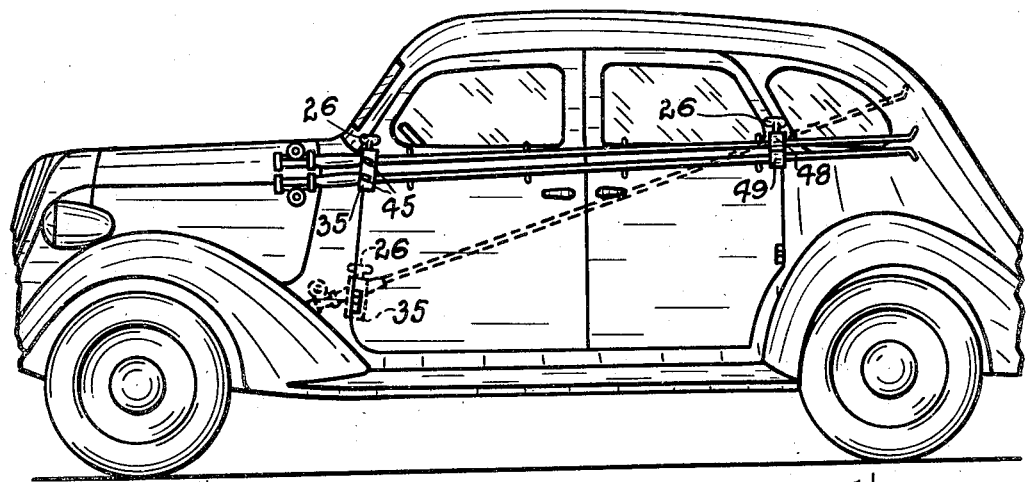
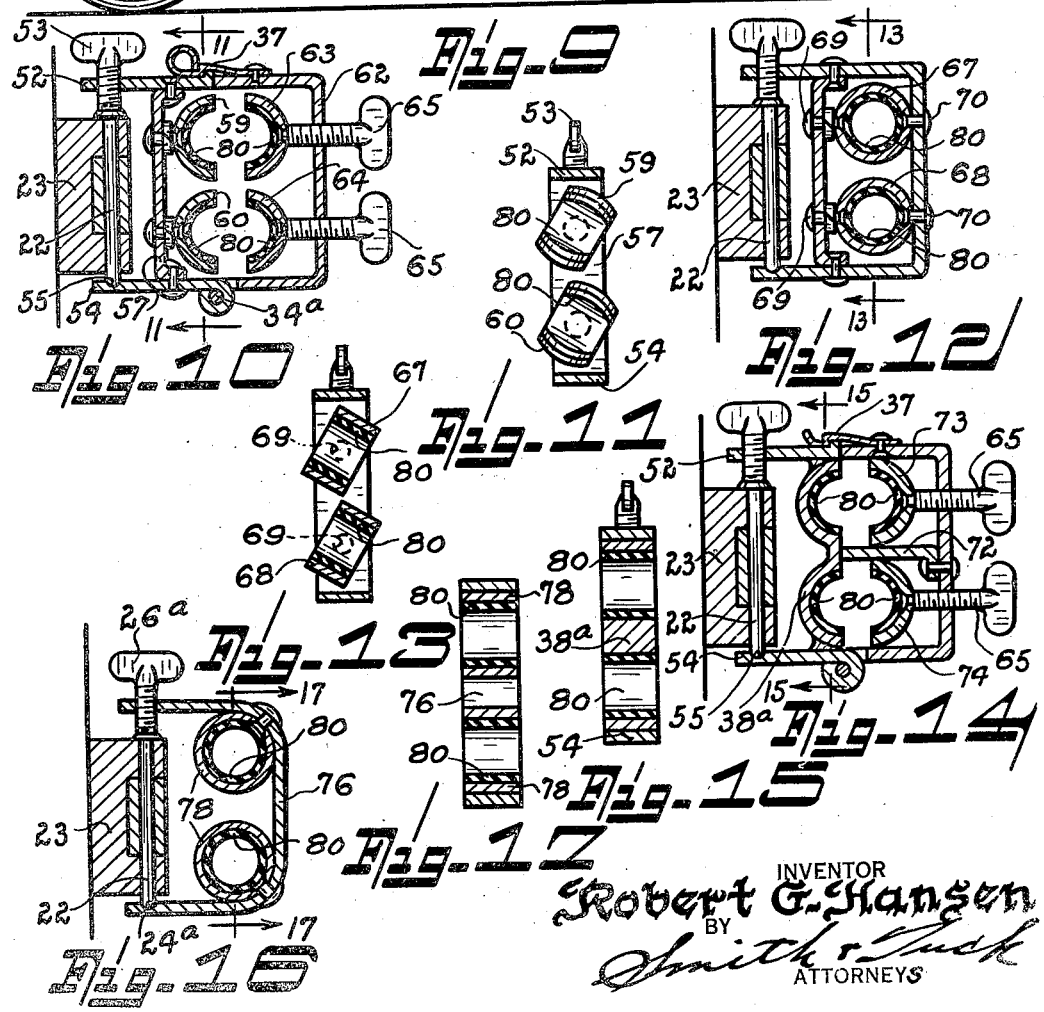
INVENTOR
Robert G. Hansen
BY
Smith & Tuck
ATTORNEYS Patented July 8, 1941

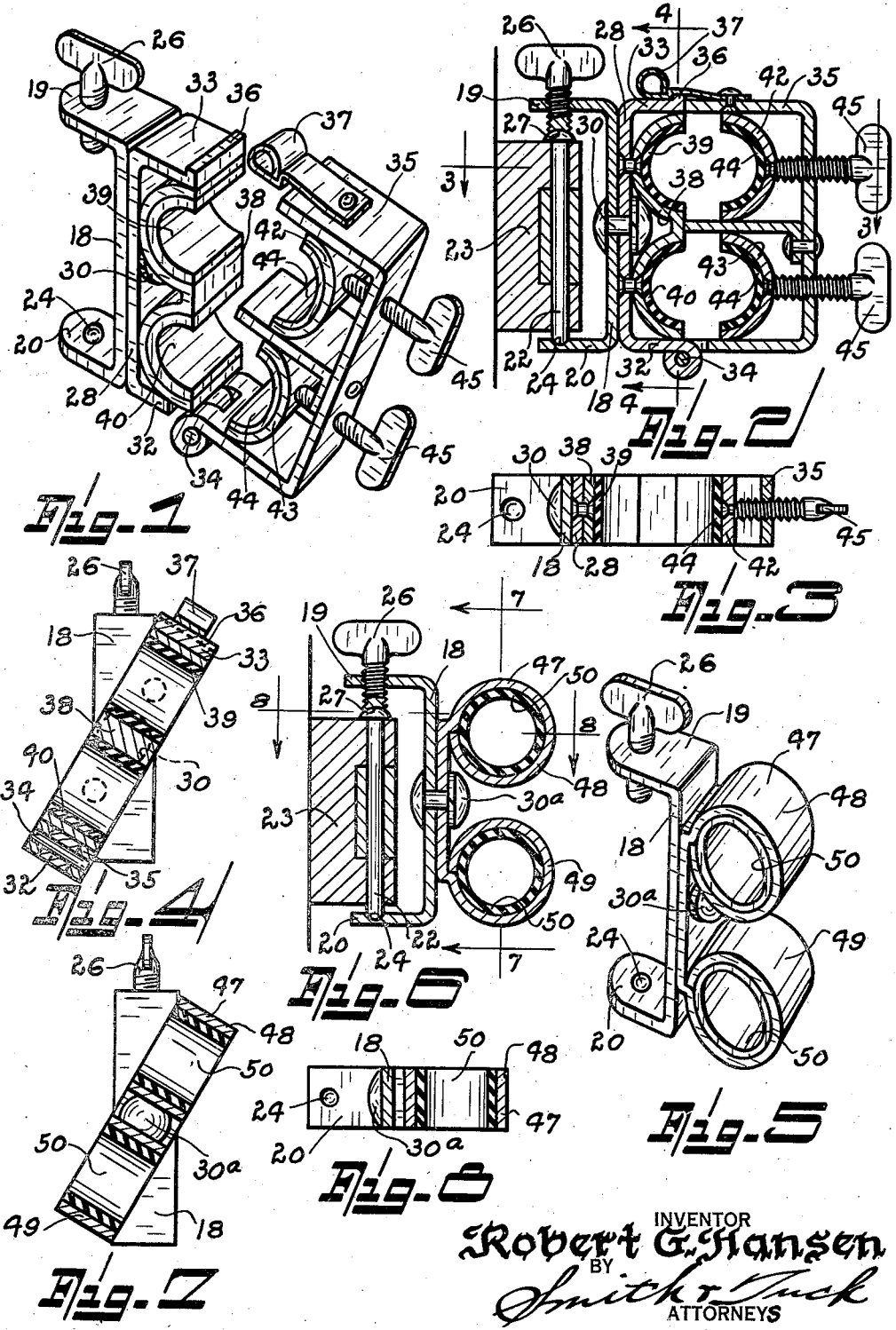

2,248,170

UNITED STATES PATENT OFFICE 2,248,170

ADJUSTABLE CARRYING BRACKET FOR AUTOMOBILES

Robert G. Hansen, Renton, Wash.

Application August 9, 1938, Serial No. 223,926

1 Claim. (Cl. 224—29)

My present invention relates to the art of transportation brackets and carriers and more particularly to an adjustable carrying bracket for automobiles.

The automobile has become so important a part of transportation that my present invention relates to a carrying bracket, for use on automobiles, intended to facilitate the carrying of poles of various types. It may be used by sportsmen to carry fishing poles; by surveyors to carry surveying range poles; or by skiers to carry ski poles, or the like. The common use of automobiles as a convenient means of transportation has made it desirable to have a suitable means for carrying relatively long poles without the necessity of unjointing the same or having to tie them on to the body with the attended danger of loss of the poles and possible disfigurement of the finish of the car.

My present invention is particularly adaptable for carrying fishing poles that are all assembled and rigged and it is in this field that they probably serve their greatest usefulness. Many times a fisherman will motor along a stream, try certain spots, then wish to get in his car again and move to some more distant spot. If he has to take his jointed fishing pole apart and then reassemble it when he reaches his new fishing ground a great deal of time is lost. This is also true of persons who wish to assemble their tackle at home so as to assure their having all the component parts on hand and, further, avoid losing valuable time when they reach the fishing grounds.

To facilitate this purpose I have provided a bracket that is intended to clamp on to the hinge pins of automobile doors and hold the poles in a definite position. To accomplish this purpose one, or more, of the brackets is provided with clamping means so that the poles may be positively held in position so as to prevent any possible loss in transit.

The principal object of my present invention is, therefore, to provide means that, without the possible disfigurement of the car in any way or the securing thereto of a permanent bracket, will hold a pole along the side of a car body.

A further object of my invention is to provide, easily operated, brackets for securing poles on an automobile, which are readily adjustable so as to make their attachment easy and secure so that poles may be held in a natural position without possible damage to the poles themselves.

Other and more specific objects will be apparent from the following description taken in connection with the accompanying drawings, wherein Figure 1 is a perspective view showing one form of my pole bracket.

Figure 2 is a transverse sectional view through my bracket arrangement.

Figure 3 is a cross-sectional view taken along the line 3—3 of Figure 2.

Figure 4 is a cross-sectional view taken along the line 4—4 of Figure 2 with the rod gripping member shown in an adjusted position.

Figure 5 is a perspective view of one form of bracket that does not provide for clamping the poles in place.

Figure 6 is a transverse sectional view through the bracket arrangement of Figure 5.

Figure 7 is a cross-sectional view taken along the line 7—7 of Figure 6.

Figure 8 is a cross-sectional view taken along the line 8—8 of Figure 6.

Figure 9 is a side elevation of an automobile showing in solid line a preferred placement of poles on an automobile, through the use of my device; in dashed line on the same figure is shown an alternate position for the poles.

Figure 10 is a transverse sectional view through a modified form of my clamping bracket for poles.

Figure 11 is a cross-sectional view along the line 11—11 of Figure 10 with the rod clamping member shown in an adjusted position.

Figure 12 is a transverse sectional view of a pole bracket not employing clamping means.

Figure 13 is a cross-sectional view along the line 13—13 of Figure 12 showing the rod supporting members in an adjusted position.

Figure 14 is a transverse sectional view similar to Figure 2 but showing a modified form of my clamping brackets in which the rod holding members are not adjustable.

Figure 15 is a cross-sectional view along the line 15—15 of Figure 14.

Figure 16 is a transverse sectional view of a rod support member suitable for use with the clamping member of Figure 14.

Figure 17 is a cross-sectional view along the line 17—17 of Figure 16.

Referring to the drawings, throughout which like reference characters indicate like parts, 18 designates the supporting bracket for my device. This is provided with a body portion which is bent at either end to provide the parallel end portions 19 and 20. This member is preferably made of metal of reasonable weight so that it can be clamped securely upon the usual hinge pin as 22 of an automobile hinge indicated at 23. Member 20 is provided with a recess at 24 adapted to engage the lower end of hinge pin 22. Leg 19 is provided preferably with a wing screw 26 which is cupped at its lower end as indicated at 27 so as to securely engage the rounded upper end or head of the hinge pin 22. In this manner it is believed it will be apparent that by clamping screw 26 tightly in place as indicated in Figure 2, a very secure engagement of member 18 to the hinge pin will be effected. This part of my structure is common with all the modified forms shown throughout the drawings.

In Figures 1 and 5 I have illustrated a pair of brackets, the one shown in Figure 1 being arranged so as to clamp the pole in place, while the one shown in Figure 5 is intended merely as a rest for the free end of the pole.

In the form of my device shown in Figure 1 I provide a clamp base 28 which is pivotally secured to member 18 as by a rivet 30. This should be set up reasonably snug so that considerable frictional engagement will occur between the abutting surfaces of members 18 and 28 but still be free enough so that it may be readily adjusted by hand. Member 28 is provided with outstanding end portions as 32 and 33. End portion 32 is provided with a hinge having the pin 34 which hingedly secures the member 28 to the clamp member 35. Member 28 is preferably provided with an upturned ledge at 36 so as to form an engaging surface for the spring locking member 37 which is fixedly secured to member 35.

Member 28 is provided with rod engaging rest member 38 which may accommodate a single pole or two as shown in the various drawings or even a plurality of poles. Preferably, rest member 38 is provided with resilient lining as 39 and 40 so that when a pole is clamped in place, it will be engaged by a yieldable pad of cork, rubber, felt, or some similar material.

Member 35 is provided with movable rod engaging members as 42 and 43. These in turn are preferably lined with resilient material as is illustrated at 44. Each of the members 42 and 43 is provided with a wing headed screw 45 so that under action of these screws members 40 and 43 may be moved toward member 38 or away from the same so as to clamp a pole in position or to free the same.

To engage the free end of the pole I provide a second member 18 made substantially as the form shown in Figure 1 but with the pole engaging members made after the showing of Figures 5, 6, 7, and 8, in which a, preferably metal, member 47 is pivotally secured to member 18 as by rivet or screw 30a so that it may be changed in its angular position with respect to member 18. Further I provide resilient lining in the rod securing loop portions 48 and 49 as shown at 50.

In Figure 10 I have shown a modification of my device in which the supporting bracket, instead of being formed of a single piece as is member 18 is formed of an upper bar 52 having the wing screw 53 and a lower bar 54 which is recessed at 55 so as to engage hinge pin 22. These two members 52 and 54 are joined together by a tie bar 57.

Pivotally mounted upon bar 57 are rod rest members 59 and 60 formed after the showing of Figure 10. Pivotally secured to bar 54 as by hinge pin 34a is the clamp member 62. Member 62 is provided with rod engaging members 63 and 64 which coact with members 59 and 60 and are capable of adjustment with respect thereto by the winged screws 65 so that proper clamping action can be obtained. As in the construction shown in Figures 1 and 2 a similar lock spring 37 is employed.

Figure 12 illustrates a bracket suitable for use with the form shown in Figure 10 and following in general the same type of construction, excepting that each of the pole support members as 67 and 68 are trunnioned at two points as 69 and 70; so that they may be adjusted the same as the support members in Figure 10 after the showing of Figure 13.

In Figure 14 I have illustrated probably the simplest form of my device in which the supporting bracket is formed after the showing of Figure 10 and the clamp member substantially in the same way excepting that a guide member 72 is provided as in the case of Figure 1 so as to form a guide for the adjustable clamp members 73 and 74. In this instance the rest member 38a is fixedly secured to members 52 and 55 as by welding or riveting the same thereto.

In Figure 16 I have illustrated a support for the free end of the rod that is suitable for use with the clamp bracket shown in Figure 14. This member is illustrated in its simplest type by forming the rod supporting bracket of a single metal bar 76 which is formed in a U shape so as to provide the recessed portion at 24a and the winged screw at 26a. In this instance the rod supporting rings 78 are fixedly secured to member 76. It is desired to point out that the various forms shown in Figures 10, 12, 14, and 16, should all preferably be provided with inner lining of resilient material as 80.

Method of operation

In using my device the first operation is to clamp two of my bracket members upon the spaced door hinge pins, on one side of the car. Usually it is most convenient to take the two upper hinge pins. Sometimes, however, particularly with high hinges, rods so positioned may interfere with clear vision or may tend to catch on brush and it may be desirable to use the upper rear hinge pin and the lower front hinge pin; or vice versa. Preferably my brackets are used in pairs, one merely a rest member as is illustrated in Figures 5, 12, and 16, and at the opposite end engaging the handle, if fishing poles are to be carried, to have a clamping bracket after the showing of Figures 1, 10, or 14.

In the case, however, of range poles and the like being carried, which have a uniform diameter throughout their length, or substantially so, it might be desirable to use two of these clamping brackets. Normally the device is used by passing the free end of the poles through the ring rest member as shown, for instance, in Figure 5, and then to open up the clamp member as shown in Figure 1 and lower the poles in place. This obviates the necessity of passing the pole entirely through these members. As soon as the rods are in place the member is closed so that spring 37 engages and then the wing headed screws are tightened. To compensate for angular placement of poles it may be desirable to adjust the rod support members after the showing of Figures 4, 7, 11, and 13.

The foregoing description and the accompanying drawings are believed to clearly disclose a preferred embodiment of my invention but it will be understood that this disclosure is merely illustrative and that such changes in the invention may be made as are fairly within the scope and spirit of the following claim:

The combination with an automobile and its hinged doors, of means for carrying articles on said doors including a supporting bracket having inturned parallel ends, the lower end having an inner depression adapted for co-action with the free end of the hinge pin, and the upper end having a threaded opening adapted to receive a bolt for co-action with the headed end of the hinge pin, an article clamp including a rectangular frame pivotally mounted on said bracket, a semi-cylindrical clamp section secured within said frame, a co-acting semi-cylindrical clamp section movable in said frame, and an adjusting bolt on said frame and engaging said movable section.

ROBERT G. HANSEN.